United States Patent [19]

Anderson

[11] 3,781,558

[45] Dec. 25, 1973

[54] VIEWING SYSTEM USING A MULTIPLE ARRAY OF DIFFERENT-SIZED DETECTORS

[75] Inventor: John Robert Anderson, Hatfield, England

[73] Assignee: Hawker Siddeley Dynamics Limited, Hatfield, England

[22] Filed: June 26, 1972

[21] Appl. No.: 266,409

[30] Foreign Application Priority Data

June 24, 1971 Great Britain .................. 29,550/71

[52] U.S. Cl. ............. 250/332, 250/220 M, 250/330

[51] Int. Cl. .............................................. G01j 1/02

[58] Field of Search .................. 250/83.3 R, 83.3 H, 250/83.3 HP, 330, 332, 220 M

[56] References Cited

UNITED STATES PATENTS

| | | | |
|---|---|---|---|
| 3,140,395 | 7/1964 | Scherbatskoy | 250/83.3 R X |
| 3,246,153 | 4/1966 | Lewis | 250/83.3 R |
| 3,291,992 | 12/1966 | Wakefield et al. | 250/83.3 R |
| 3,691,383 | 9/1972 | Fisher | 250/83.3 H |

*Primary Examiner*—Archie R. Borchelt
*Attorney*—Howard L. Rose et al.

[57] ABSTRACT

In a viewing system for employment in conditions of low visibility, an image of the scene viewed is scanned by a multiple array of effectively different-sized detectors. The individual outputs of the detectors are pre-amplified and filtered and the filtered outputs of the several different-sized detectors viewing the same part of the image are combined on a single output signal channel feeding the display device. The pass bands of the filters are chosen so that the larger-sized detectors provide image detail of lower spatial frequencies and the smaller-sized detectors provide detail of higher spatial frequencies.

8 Claims, 7 Drawing Figures

VIEWING SYSTEM USING A MULTIPLE ARRAY OF DIFFERENT-SIZED DETECTORS

This invention relates to viewing systems, especisystems employing scanning by means of multi-element infra-red sensitive detectors.

There are many applications where it is desirable to obtain good long-range vision at night and in conditions of low visibility. It is most desirable to use the inherent thermal radiation, at wavelengths between 4 and 14 micrometres, from the scene to be viewed. If this can be done it avoids the need for starlight or an illuminator and it greatly reduces loss of contact due to haze, mist or fog, which have significant possibility of occurrence by night.

However, a fundamental physical limit determines the performance which can be achieved with such systems if scanning of the image of the scene by a single infra-red detector is employed. Only one approach is possible to improve performance, and this involves use of a multi-element detector array. But to achieve the performance required in typical applications and using known methods necessitates the use of several hundred detector elements and associated amplifier channels. This results in a high equipment cost.

It is therefore an object of the invention to achieve the required increase in performance with far fewer detector elements.

According to the present invention, there is provided a viewing system wherein an image of the scene viewed is scanned by a multiple array of detectors, said array comprising detectors of different effective sizes arranged to scan the same parts of the image, and wherein the outputs of the several different-sized detectors scanning any particular part of the image are combined after being individually filtered, the pass bands of the filters being chosen so that the filtered outputs of the larger-sized detectors provide image detail of lower spatial frequencies and the filtered outputs of the smaller-sized detectors provide image detail of higher spatial frequencies.

The invention depends on the fact that the modulation transfer function of the observer's eye falls off at higher spatial frequencies. As a result an increase in noise level can be tolerated at high spatial frequencies, the observer's eye being unable to detect quite large brightness fluctuations at the higher spatial frequencies.

The detector array can either be made up of several sets of elements of different sizes, or it may comprise a matrix of elemental detectors all of one size but capable, by means of the arrangement of their output amplifier channels, of being sampled in blocks containing different numbers of elements. These blocks are then equivalent to single detectors having areas that are different multiples of the area of each single constituent element of the matrix.

Figure 1A:
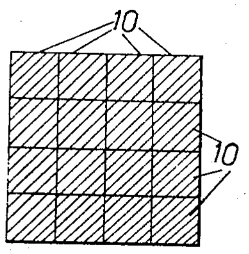
Figure 1B:
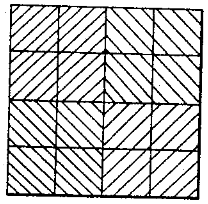
Figure 1C:
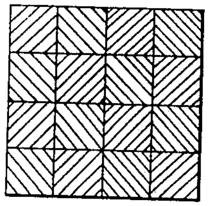
Figure 2:
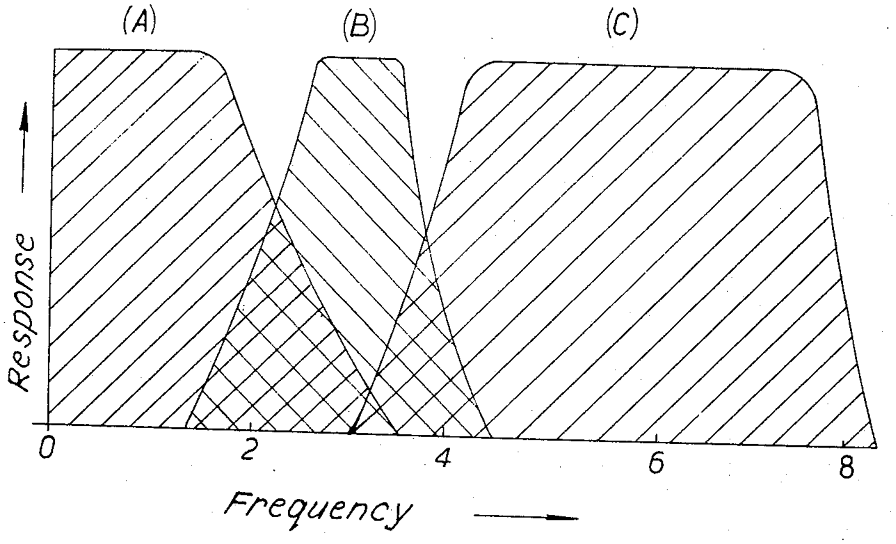
Figure 3:
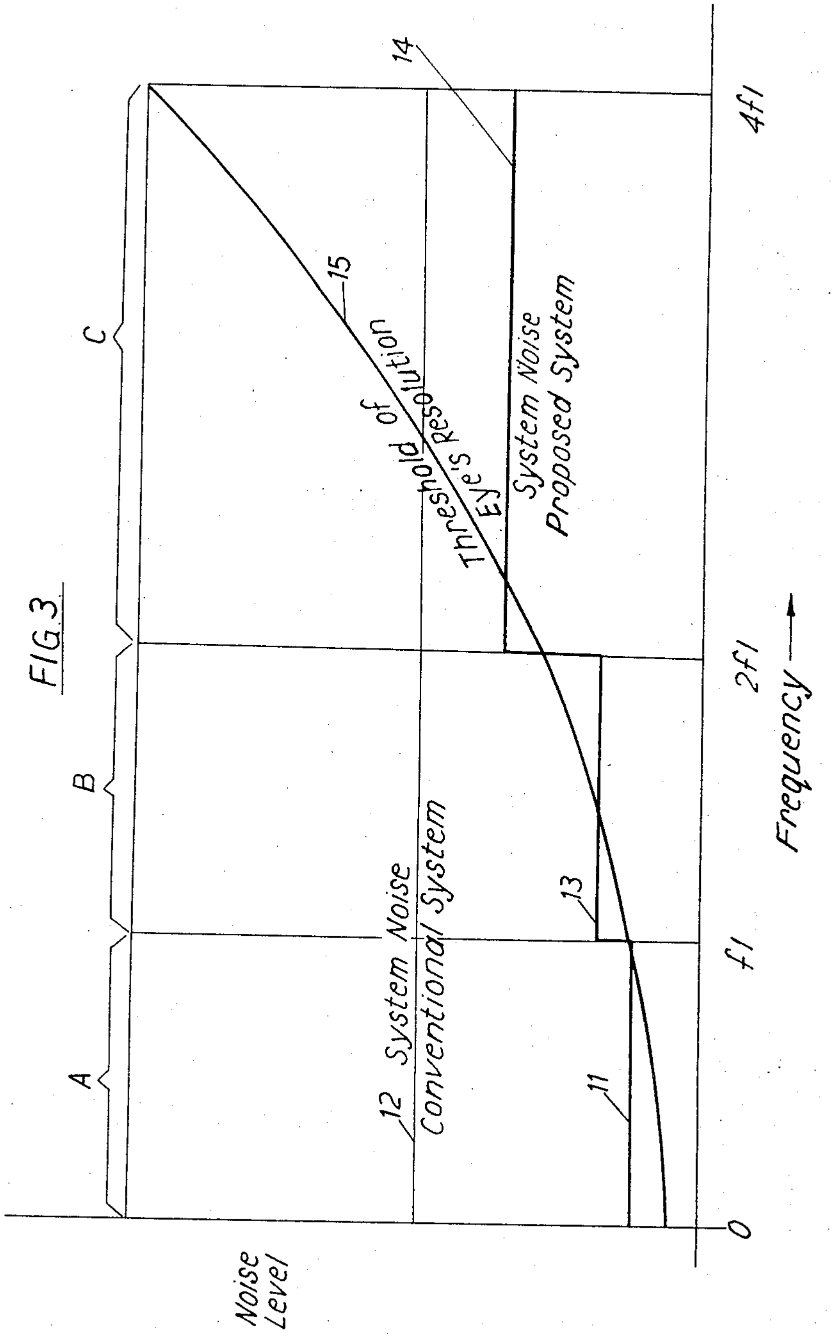
Figures 4, 5:
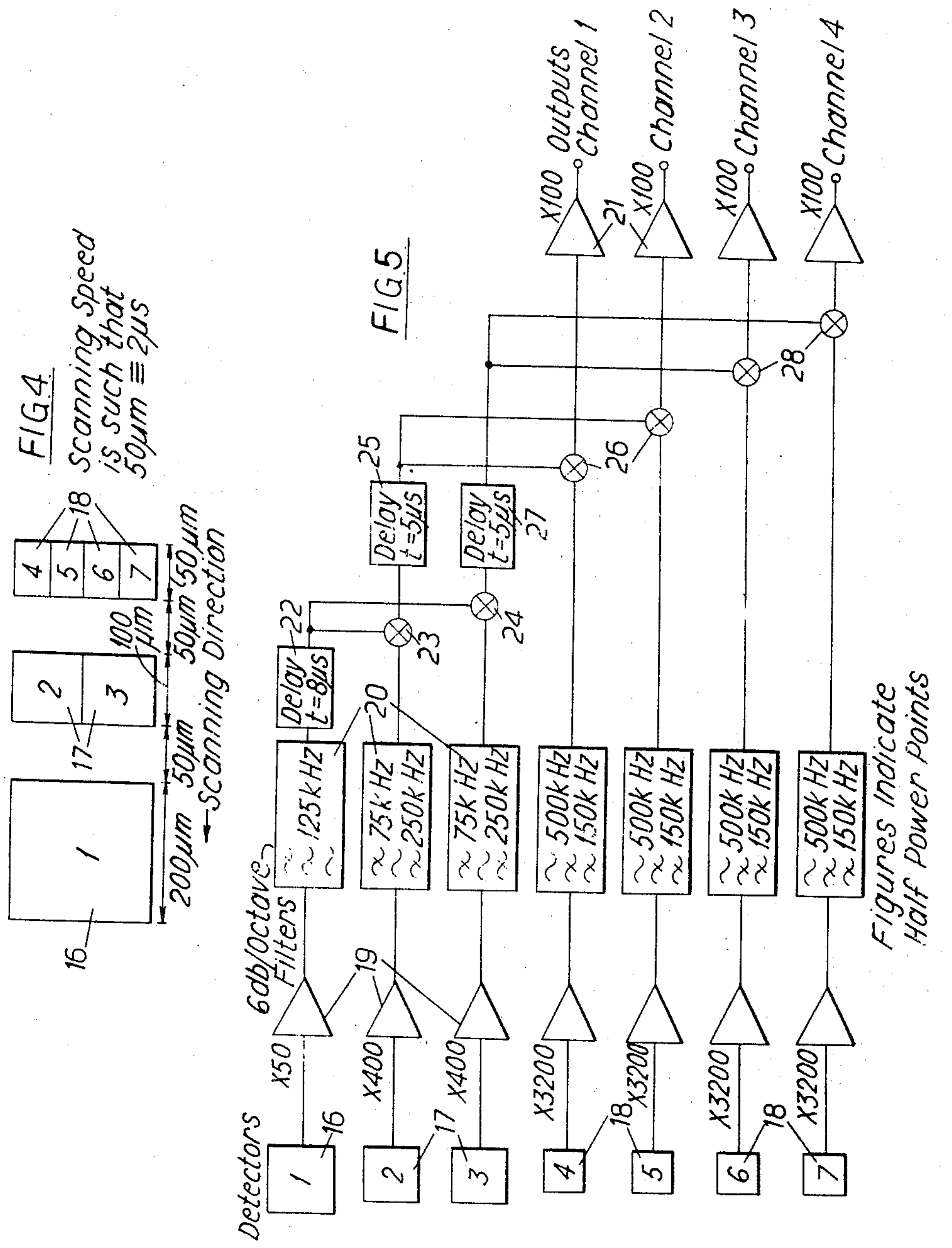

Arrangements in accordance with the invention will now be described by way of example with reference to the accompanying drawings, in which:

FIGS. 1A, 1B and 1C are three diagrams of one detector array that can be employed in the practice of the invention, FIG. 2 is a plot of detector response against frequency for the array of FIGS. 1A, 1B and 1C, FIG. 3 is a plot of detector signal noise against frequency for the array of FIGS. 1A, 1B and 1C, FIG. 4 is a diagram of an alternative detector array, and FIG. 5 is a circuit and block diagram of a system utilising the detector array of FIG. 4.

In an infra-red viewing system a change of detector size results in a change in the signal-to-noise ratio of the system. Considering, as an example, a square array of elemental detectors in the form of a 4 × 4 matrix of sixteen elements 10, as shown in FIG. 1A, the signal-to-noise ratio of the array as a whole will be 16 times that of the individual elements, assuming the bandwidth is adjusted to the optimum. It gives good imagery of extended objects involving only low spatial frequencies but, due to its size it attenuates high spatial frequencies and so is not effective in rendering the finer detail in the image.

The output of the whole of this 4 × 4 matrix may advantageously be used to provide the low frequency response to the scanned image, as shown at (A) in FIG. 2. The noise in this part of the passband will be a sixteenth of that of each individual element, giving the signal-to-noise ratio improvement factor which is desired with a margin in hand. FIG. 3 shows, at (A), the noise level 11 for the whole array of FIG. 1A compared with the noise level 12 of a conventional system; it will be seen that there is improvement by about a factor of 4.

For finer detail in the scanned image the detector elements in the array may be sampled in 2 × 2 square groups or blocks as shown in FIG. 1B. If the constituent detector outputs so groups are passed through an appropriate band pass electric filter they can advantageously be used to contribute a range of frequencies higher than that of the whole 4 × 4 matrix, as shown at (B) in FIG. 2. The noise in this part of the frequency spectrum will be a quarter that of the individual detector elements 10. However, since with the array as shown two successive 2 × 2 blocks or groups of the individual elements 10 scan each picture element, it is possible on the display to reduce noise by a further factor of $\sqrt{2}$ to about 1/5.6 that of each individual element 10. This noise level is indicated at 13 in FIG. 3.

Lastly, the output of each individual element 10 taken singly (as represented in FIG. 1C), and passed through a higher frequency band pass filter, can be used to contribute the highest range of frequencies as shown at (C) in FIG. 2. Each element of the picture is then scanned by four successive detector elements 10, which fact can be used to reduce noise in the display by a factor of 2, this noise level being indicated at 14 in FIG. 3. FIG. 3 thus shows the noise of the resulting system as a stepped function of frequency.

The optimum viewing distance for a television raster display is somewhat flexible but it is not acceptable to view from a distance much less than that at which the individual raster lines subtend $5 \times 10^{-4}$ radians (this corresponds to viewing a commercial television display at a distance of four times the picture height. The raster must obey the normal samples convention of two samples per cycle of bandwidth and this corresponds to the 3 db point of FIG. 3. It has therefore been possible from these relationships to superimpose the modulation transfer function 15 of the human observer's eye on FIG. 3, to indicate its ability to discern noise. It can be seen that the response to the eye falls off at a rate comparable with that at which the noise level 11, 13, 14 increases, so that the degradation of picture detail by noise will be almost imperceptible to the human observer over the complete range of detail dimensions.

FIG. 4 shows a different form of detector array. Here, instead of a 4 × 4 matrix, a single large detector 16 is followed by a line array of two smaller detectors 17 one half its dimension and a second line array of four even smaller detectors 18 a quarter its dimension. Each picture point is scanned only once by each size of detector in this embodiment so that tie advantage of noise reduction due to integration is lost but the detector array is easier to fabricate.

FIG. 5 shows a system utilizing the detector array of FIG. 4. In FIG. 4, the direction of scan is indicated by the arrow. F; that is to say each picture point is scanned by the largest element 16 first and there is a delay before scanning by the intermediate-sized elements 17 takes place, and a further delay before scanning by the smallest elements 18. Delay networks are therefore incorporated into the circuitry of FIG. 5 to compensate for this. Basically, each of the seven detector elements 16, 17, 18, shown numbered 1 to 7, feeds its signal to an individual channel including a pre-amplifier 19 and a filter 20, and then the seven filter outputs are combined to give only four channel outputs, on output channels numbered 1 to 4, via four output amplifiers 21.

The gain of the pre-amplifiers 19 for the intermediate-sized detector elements 17 is greater than that of the pre-amplifier for the largest detector element 16, and the gain of the pre-amplifiers for the smallest detector elements 18 is still greater. Similarly, the pass band of the filters 20 for the detector elements 17 is higher than that for the detector element 16, and the pass band of the filters for the detector elements 18 is still higher. The output amplifiers 21 of the four output channels numbered 1 to 4 receive directly the outputs of the filters 20 for the four smallest detector elements 18 numbered 4 to 7, respectively. The output of the filter for the large detector element 16 is appropriately delayed in a delay network 22 and then combined, at summing junctions 23 and 24, with the outputs of each of the two filters for the intermediate-sized detector elements 17. The combined signal from the summing junction 23, containing the output of the pre-amplifier and filter channel for the detector element numbered 2, is then further delayed in a delay network 25 and combined with each of the inputs applied to the two output amplifiers 21 feeding the output channels numbered 1 and 2, at summing junctions 26. Similarly, the combined signal from the summing junction 24, containing the output of the detector numbered 3, is further delay in a network 27 and combined with each of the inputs applied to the output amplifiers feeding the output channels numbered 3 and 4, at summing junctions 28.

It will be seen that the arrangements described enable the sensitivity required to be achieved using between 7 and 16 detector, pre-amplifier and filter channels, whereas conventional methods would require 300 to 400.

Other advantages of these approaches, and particularly that of the array configuration of FIG. 1A, are that detector element uniformity can be relaxed since each picture element is scanned by several detector elements. The configuration of FIG. 1A can also be used with a spiral scan pattern to further improve sensitivity where uniform resolution over the field of view is not necessary.

While the invention has particular applicability to infra-red viewing systems it is not so limited and can be applied to systems working in other wavelengths.

What I claim is:

1. A viewing system for low visibility conditions, comprising: means forming an image of the scene viewed, a multiple array of image-scanning detectors scanning said image of the scene viewed, said array consisting of detectors of different effective sizes arranged to scan the same parts of the image filters individually filtering the outputs of said detectors, and means combining the filtered outputs of the several different-sized detectors scanning the same part of said image, the pass bands of the filters being so chosen that the filtered outputs of the larger-sized detectors provide image detail of lower spatial frequencies and the filtered outputs of the smaller-sized detectors provide image detail of higher spatial frequencies.

2. A system according to claim 1, wherein the array includes detectors of at least three different sizes to scan each part of the image, thereby respectively providing image detail of low, intermediate and high spatial frequencies.

3. A system according to claim 2, wherein the intermediate-sized detectors have a dimension that is a multiple of that of the smallest-sized detectors, and the largest-sized detector, of which there may be only one, has a dimension that is a similar multiple of that of the intermediate-sized detectors.

4. A system according to claim 1, wherein each part of the image is scanned by several different-sized detectors in sequence, and comprising delay means to delay the outputs of the detectors earlier in the sequence before combination with the outputs of detectors later in the sequence.

5. A system according to claim 1, comprising pre-amplifiers amplifying the outputs of the different-sized detectors before said outputs are filtered, said pre-amplifiers having different gains appropriate to the detector size.

6. A system according to claim 1, wherein the array comprises a matrix of equal-sized small detector elements, different numbers of which are employed in groups to give effectively different-sized detectors.

7. A system according to claim 6, wherein there are in the array 16 detector elements arranged in a 4 × 4 square matrix. A system according to claim 6, wherein, at least for the smaller detector sizes, each part of the image is scanned in sequence by more than one detector of the same size, thereby improving the overall signal-to-noise ratio.

* * * * *